(12) United States Patent
Gehman et al.

(10) Patent No.: US 6,591,674 B2
(45) Date of Patent: Jul. 15, 2003

(54) SYSTEM FOR SENSING THE MOTION OR PRESSURE OF A FLUID, THE SYSTEM HAVING DIMENSIONS LESS THAN 1.5 INCHES, A METAL LEAD FRAME WITH A COEFFICIENT OF THERMAL EXPANSION THAT IS LESS THAN THAT OF THE BODY, OR TWO RTDS AND A HEAT SOURCE

(75) Inventors: Richard William Gehman, Freeport, IL (US); Christopher Michael Blumhoff, Sterling, IL (US); Jamie Wandler Speldrich, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/746,282

(22) Filed: Dec. 21, 2000

(65) Prior Publication Data

US 2002/0078744 A1 Jun. 27, 2002

(51) Int. Cl.[7] ................................................ G01F 1/68
(52) U.S. Cl. .................................. 73/204.22; 73/204.21
(58) Field of Search ........................ 73/204.21, 204.22, 73/204.11

(56) References Cited

U.S. PATENT DOCUMENTS

| | | | | |
|---|---|---|---|---|
| 3,981,074 A | * | 9/1976 | Yamamoto et al. | 174/52.4 |
| 4,326,214 A | * | 4/1982 | Trueblood | 174/52.3 |
| 4,655,088 A | * | 4/1987 | Adams | 73/431 |
| 4,672,997 A | * | 6/1987 | Landis et al. | 73/204.21 |
| 4,829,818 A | * | 5/1989 | Bohrer | 73/204.22 |
| 4,856,328 A | * | 8/1989 | Johnson | 73/202 |
| 5,231,877 A | * | 8/1993 | Henderson | 73/204.25 |
| 5,319,973 A | * | 6/1994 | Crayton et al. | 73/756 |
| 5,385,046 A | * | 1/1995 | Yamakawa et al. | 73/204.22 |
| 5,404,753 A | * | 4/1995 | Hecht et al. | 73/204.22 |
| 5,741,968 A | * | 4/1998 | Arai | 73/204.22 |
| 5,763,787 A | * | 6/1998 | Gravel et al. | 137/487.5 |
| 5,844,135 A | * | 12/1998 | Brammer et al. | 73/118.2 |
| 5,942,694 A | * | 8/1999 | Robins et al. | 73/700 |

* cited by examiner

Primary Examiner—Harshad Patel
(74) Attorney, Agent, or Firm—Kris T. Fredrick

(57) ABSTRACT

A system for sensing or measuring the motion of a fluid such as air. The system typically has a two-part plastic body containing an internal flow passage. The parts of the body may snap together or attach with an adhesive. A transducer or an electronic sensor is typically located within the flow passage, which may measure mass flow rate and may have two resistive thermal devices (RTDs) located on either side of a heat source. The body may have two elongated port tubes configured to attach to tubing. The port tubes may contain venturis, and may be substantially straight and substantially parallel, forming a U shape. A metal lead frame may be provided in electrical communication with the sensor. The lead frame may be integrally molded within the body, and may have a lower coefficient of thermal expansion than the body. The internal flow passage and the sensor may be substantially symmetrical and measure the flow rate of the fluid substantially equally in either flow direction. The system may be configured for surface mounting or for through-hole mounting, and may be a dual in-line type.

10 Claims, 6 Drawing Sheets

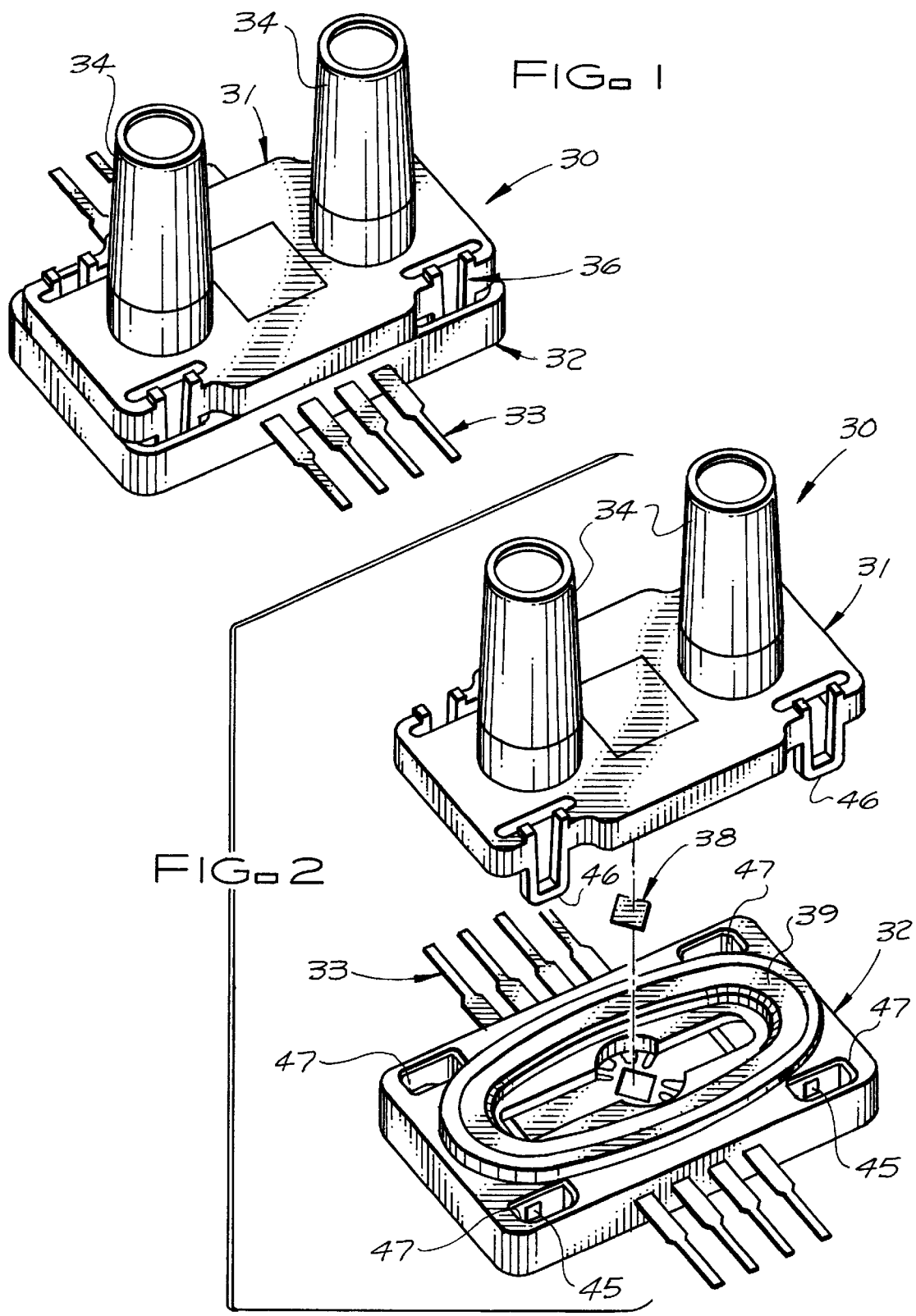

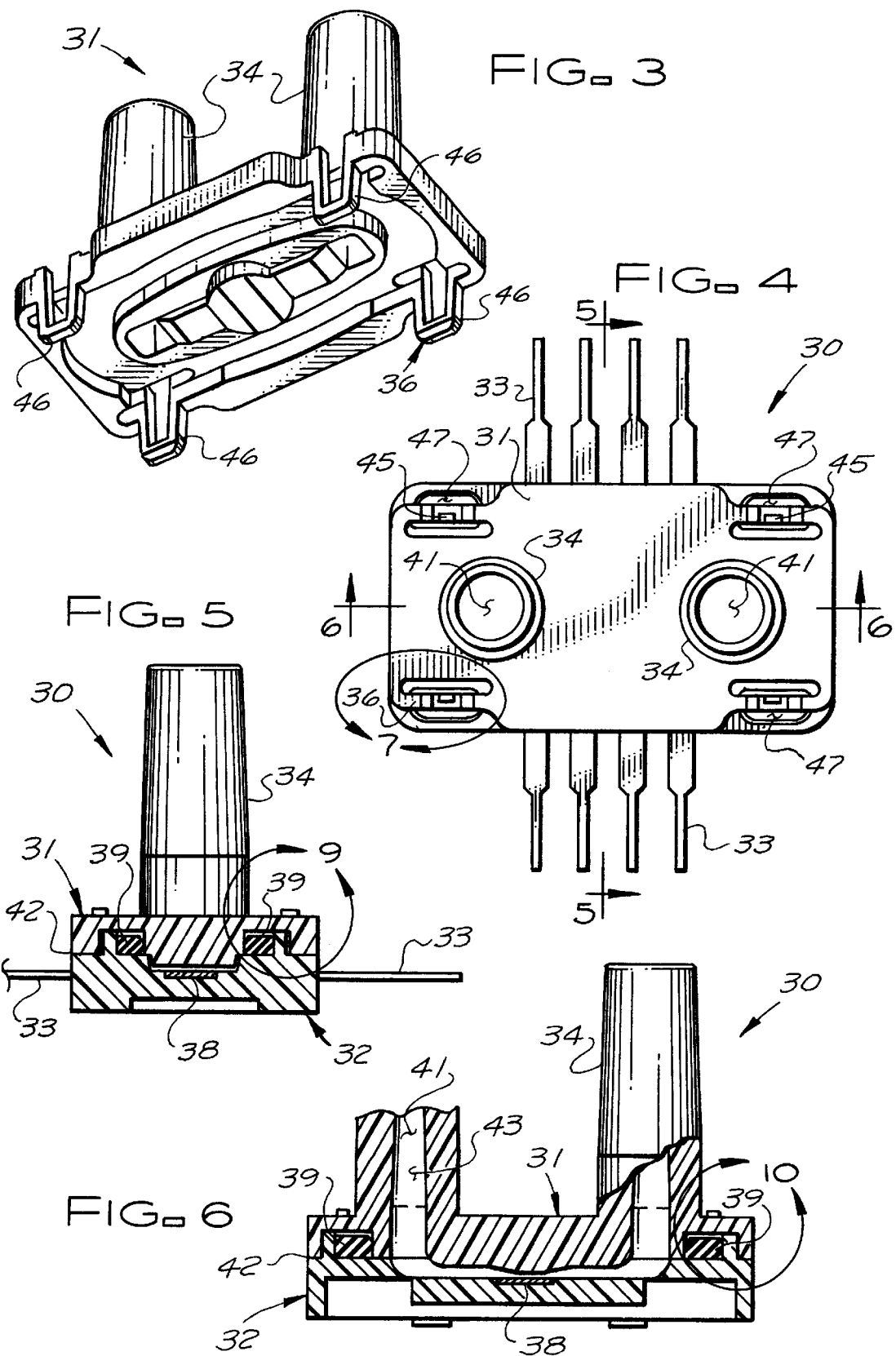

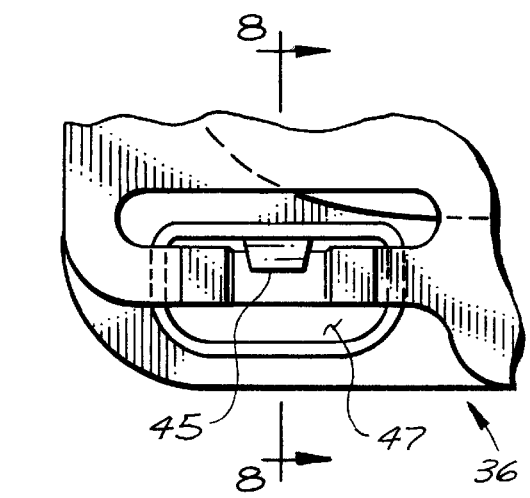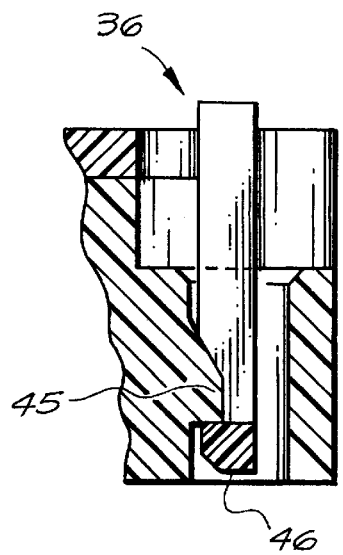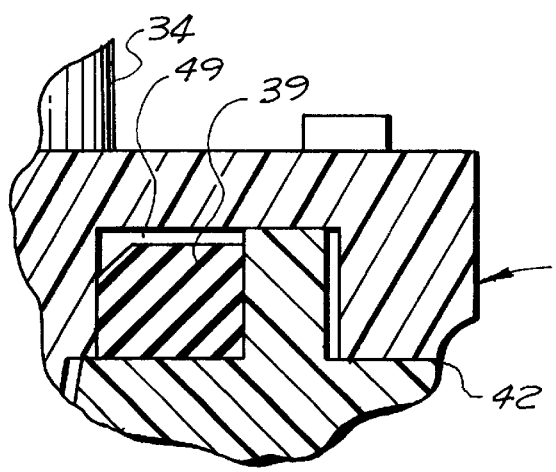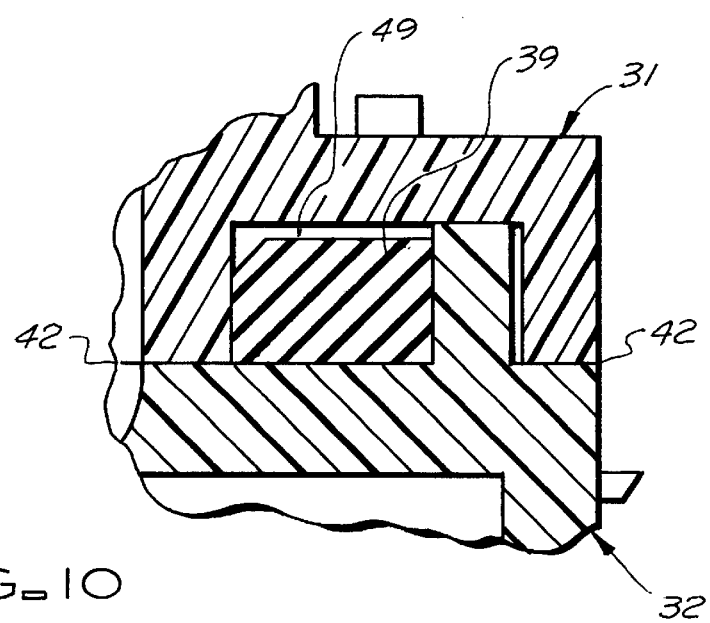

SYSTEM FOR SENSING THE MOTION OR PRESSURE OF A FLUID, THE SYSTEM HAVING DIMENSIONS LESS THAN 1.5 INCHES, A METAL LEAD FRAME WITH A COEFFICIENT OF THERMAL EXPANSION THAT IS LESS THAN THAT OF THE BODY, OR TWO RTDS AND A HEAT SOURCE

BACKGROUND OF THE INVENTION

1. Field of the Invention

This invention relates generally to systems and devices for sensing or measuring the motion of fluids and producing an electrical signal indicative of such motion.

2. Description of the Related Art

There are many situations where it is necessary or desirable to sense or measure the velocity, pressure, or flow rate of a fluid. Such situations include fluids that are both liquids and gasses and include both internal and external flow. For example, such systems or devices may be used to measure the air-speed of an aircraft, the water flow rate in a canal, pipeline, or river, the air flow rate into an internal combustion engine, or the flow rate through a ventilation duct in a heating, ventilating, and air-conditioning (HVAC) system of an office building. In many such applications, such as where electronic controls are used, it is necessary or desirable for such measuring devices to provide an electronic output that can be displayed on an electronic display or directly interface with an electronic control system. Many such systems and devices have been developed over the years including hot wire systems and systems and devices that measure velocity or flow rate indirectly by measuring pressure or pressure differences. Systems and devices that measure velocity or flow rate indirectly by measuring pressure or pressure differences include those that use structures that extend into the flow stream such as pitot tubes, and those that measure from the side of the flow stream such as venturi meters.

Some flow measurement systems or devices impede the flow to some degree, such as weirs and orifice plates, while others, such as pitot tubes, typically do not impede the flow significantly. In some applications, some degree of obstruction of the flow is not a problem, such as a weir wall used to measure the flow rate in a stream. However, in other applications, it is necessary or desirable to impede the flow as little as possible, such as applications where significant amounts of energy are required to generate the flow. Where the flow rate of a fluid is the desired parameter to be measured, many systems and devices measure the flow rate by measuring the velocity at one or more locations, and using the velocity to calculate the flow rate. The flow rate may be either a volumetric flow rate or a mass flow rate.

Historically, systems for measuring the motion of fluids, such as flow sensors, have been stand-alone systems of their own. They have been bulky, expensive, quite large and not suitable for integration into small electronic systems. There has also been a lack of flexibility in design preventing incorporation into a variety of subsystems. More recent use of thick film hybrid type airflow sensing products have greatly reduced size and improved integration potential using single in-line electrical connections. They also have electrical input and output requirements more compatible with typical electronic products. Some such products have the additional advantage of being manifold mountable, which reduces system space requirements and allows semi-automation of the pneumatic part of product assembly. While these examples are improvements over prior art, they still require manual electronic assembly at high cost and low throughput. In addition, their size is still typically the largest component in a control system circuit. There is a clear lack of a small sensor, particularly for airflow, that can be assembled by automated equipment and handled, as are other electronic components.

Previous solutions have included alternative sensing techniques, like differential pressure sensors, which typically suffered from poor accuracy. The other sensors have problems of their own, being expensive and of limited availability in standard package configurations.

SUMMARY OF THE INVENTION

It is an object of this invention to provide a system for measuring the motion of a fluid, the system having a maximum of features and capable of being manufactured in a very small standard package. Other objects of the invention are to provide an improved system that will integrate control systems, lower cost, reduce power consumption, and reduce size while implementing highly automated mass assembly manufacturing. Further objects of the invention include that the product be compatible with factory automation, that it have improved interchangeability, that it have a minimum number of parts and that it be readily capable of being modified for manifold mount, minimum pressure drop or controlled pressure drop applications.

In furtherance of these objects, the present invention provides a system for sensing the motion of a fluid that has a body with an internal flow passage, an electronic sensor located within the flow passage, and a metal lead frame that is in electrical communication with the sensor and integrally molded with the body. The body may be made of two parts that are joined by a joint that may snap together or attach with an adhesive, heat staking, or ultrasonic welding. The body may have outside dimensions of width, depth, and height that are each less than 1.5 inches, or may have a volume of less than 0.25 cubic inch. The body may be made of plastic or thermal plastic, and the metal of the lead frame may have a lower coefficient of thermal expansion than the plastic to reduce leakage between the two. Specifically, the metal may have a coefficient of thermal expansion that is less than 10 parts per million per degree Celsius and the plastic may have a coefficient of thermal expansion that is greater than 50 parts per million per degree Celsius. The body may have two elongated port tubes configured to attach to tubing, and the port tubes may each have a venturi. The sensor may have an RTD and a heat source. In one embodiment, the internal flow passage and the sensor are substantially symmetrical and the system is configured to measure the flow rate of the fluid substantially equally in either flow direction. In this embodiment, the sensor may comprise two RTDs located on either side of a heat source. The fluid sensed with the present invention may be a gas, such as air. The system may be configured for surface mounting or for through-hole mounting. The motion that is sensed may be flow rate, or specifically, mass flow rate. The lead frame may have pins on substantially opposite sides. The body may have pins from the lead frame projecting from one side that are all in substantially the same plane, or may have pins from the lead frame projecting from two sides where the pins from each side are in substantially the same plane. The system may also comprise a control system for a heating, ventilating, and air-conditioning system, or even the heating, ventilating, and air-conditioning system itself.

The present invention also provides a system for sensing the pressure or flow rate of a fluid with a body that has an internal flow passage and is formed from two parts that are joined by a joint that has an elastomeric seal that is integral with one part. There is also a transducer located within the flow passage. The two parts of the body may be attachable to each other with snap connectors, and the body may have outside dimensions of width, depth, and height that are each less than 1.5 inches. The body may have a port tube, which may have a venturi, and may be substantially straight. The system may be a dual in-line package.

The present invention further provides a system for measuring the flow rate of a gas with a body that has an internal flow passage and is formed in two parts that are configured to snap together. There is also a sensor located within the flow passage. The body may have outside dimensions of width, depth, and height such that width multiplied by depth multiplied by height is less than 0.5 cubic inch.

BRIEF DESCRIPTION OF THE DRAWINGS

The present invention is illustrated by way of example and not limitation in the accompanying figures, in which like reference numbers indicate similar elements, and in which:

FIGS. 1–10 illustrate a first exemplary embodiment of the present invention, and specifically:

FIG. 1 is an isometric assembly view;

FIG. 2 is an exploded isometric view illustrating the major components;

FIG. 3 is an isometric bottom view of the flow tube component;

FIG. 4 is a top view which also shows where FIGS. 5, 6, and 7, are taken;

FIG. 5 is a cross-sectional end view showing exemplary embodiments of the seal and the joint between the flow tube and the base, and also showing where FIG. 9 is taken;

FIG. 6 is a cross-sectional side view showing exemplary embodiments of the seal, the joint between the flow tube and the base, the internal flow passage, and an of the internal structure of the system, and also showing where FIG. 10 is taken;

FIG. 7 is a top view detail illustrating an exemplary embodiment of the snap-fit feature, which also shows where FIG. 8 is taken;

FIG. 8 is a cross-sectional side view detail illustrating an exemplary embodiment of the snap-fit feature;

FIG. 9 is a cross-sectional end view detail illustrating an exemplary embodiment of the seal; and FIG. 10 is a cross-sectional side view detail illustrating an exemplary embodiment of the seal;

FIG. 12 is an isometric assembly view;

FIG. 13 is a partially exploded isometric view which illustrates an exemplary embodiment of how the flow tube and base fit together; and FIG. 14 is a cut-a-way partially-exploded isometric view showing exemplary embodiments of the venturis and lead frame;

FIG. 16 is an exploded isometric view illustrating an exemplary embodiment of the major components;

FIG. 17 is a top view; and

FIG. 18 is an end view; and

DETAILED DESCRIPTION OF EXEMPLARY EMBODIMENTS

Figure 11:
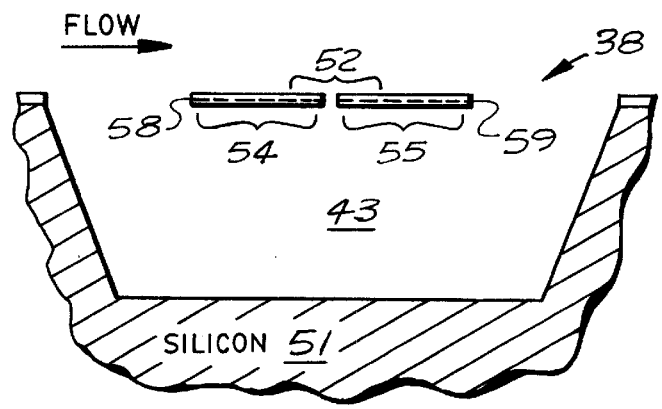
FIG. 11 is a cross-sectional side view illustrating an exemplary embodiment of a representative electronic sensor chip.

The present invention provides an apparatus or system for sensing or measuring the motion of a fluid. For example, embodiments of the present invention may be used to measure flow rate. The present invention generally measures mass flow rate (units of mass per unit of time) more directly than volumetric flow rate (units of volume per unit of time). This is because the present invention directly measures heat transfer, which is more closely proportional to mass flow rate. However, embodiments of the present invention may also be used to measure or calculate volumetric flow rate or pressure (force per unit of area). For instance, volumetric flow rate is approximately proportional to mass flow rate where pressure is nearly constant. In addition, flow rate is generally related to pressure differential (i.e. pressure drop across the present invention). These parameters can be used to calculate other values as well, as would be understood by a skilled artisan.

In many applications, the fluid sensed or measured is a gas, and may be air, or alternatively, may be nitrogen, oxygen, carbon dioxide, or the like, or mixtures thereof. Some embodiments of the present invention are general-purpose sensors, which have many potential applications. Embodiments of the present invention may be used, as an example, in heating, ventilating and air-conditioning (HVAC) systems. Specifically, embodiments of the present invention may be used in control systems for HVAC systems. However, the present invention has uses in many commercial, industrial, medical, military, and other applications as would be appreciated by a person skilled in the art. In addition, due to consistent output between different units, in many applications, the present invention does not require calibration. As a specific example, for some embodiments, the output may be expected to vary by as little as 4% between units.

The present invention may be constructed or made smaller than the prior art (e.g. for a range of flows from −200 standard cubic centimeters per minute of air (sccm) to +200 sccm). The ability to be made in small sizes and still perform well is both novel and a significant advantage of many embodiments of the present invention. However, the present invention may also be made in larger sizes, e.g. for measuring large flows. Another way to measure larger flows is to divert a portion of the flow through a smaller version of the present invention. As an example, several pitot tubes distributed across a cross-section of an HVAC duct may be manifolded together and connected to the present invention with tubing. In such an arrangement, the flow through the present invention may be related to the average velocity pressure of the flow through the duct, which may be related to the average velocity, which in turn is related to the flow rate. It is preferable that the total flow (e.g. through the duct) be substantially proportional to the flow through the present invention, or otherwise related in a known mathematical relationship.

Referring now to the figures, FIGS. 1–10 illustrate a first exemplary embodiment 30 of the present invention, a snap-together elastomerically sealed package. This design allows for a variety of products to be built with only minor tooling changes, some of which are illustrated in the various embodiments shown. As can be seen in FIG. 1, first exemplary embodiment 30 has a body which comprises two main parts: flow tube 31 and base 32, which may be configured to snap together or are snap attachable, e.g. via snap connectors 36. Four snap connectors 36 are shown, although another number of snap connectors 36 or other methods of forming a snap-together body could be used. In first exemplary embodiment 30, flow tube 31 has two port tubes 34, and base 32 has lead frame 33, typically molded into it. First exemplary embodiment 30 could be mounted with base 32 resting on a surface (not shown), i.e. a surface mount, or could be mounted with port tubes 34 extending through holes in a surface (not shown), i.e. a through-hole mount.

FIG. 2 shows the major components of first exemplary embodiment 30 in an exploded view. In addition to the major components discussed with reference to FIG. 1, FIG. 2 shows chip 38 and gasket 39. In a typical installation, some type of fluid conduit (not shown), such as pipe, hose, or tubing, attaches to port tubes 34. For instance, 5 mm or 0.2-inch flexible tubing may be used. Port tubes 34 are typically elongated, as shown, and configured to attach to tubing. For instance, port tubes 34 may be tapered or ribbed on the outside to facilitate attachment of tubing. The connection to such tubing typically results in less than 1-% leakage. The fluid to be measured typically flows through one piece of the tubing, into one of the port tubes 34, across chip 38, out the other port tube 34, and returns through another piece of tubing (not shown). In other words, the fluid to be measured typically flows through internal flow passage 41, which is illustrated, for example, in FIG. 6. Internal flow passage 41 may be formed by base 32 and flow tube 31, and may include port tubes 34. Chip 38 is typically located within internal flow passage 41. Some embodiments of the present invention may work best (e.g. be most consistent and accurate over the range of flows), particularly in smaller configurations, where Internal flow passage 41 has a smooth surface finish and sharp radius internal corners are avoided.

The present invention typically has a sensor or transducer, which may be an electronic sensor, typically located within an internal flow passage and of a type that produces an electrical output. Chip 38 is an exemplary embodiment of such a sensor or transducer. Chip 38 may be an electronic sensor such as a micromachined silicon thermal to electronic transducer chip. In first exemplary embodiment 30, chip 38 is mounted in recess 48 in base 32, as shown in FIG. 2. Recess 48 is preferably configured such that when installed, chip 38 is flush with the surrounding material of base 32 to minimize the generation of turbulence at the edges of chip 38. In some configurations, chip 38 comprises one or more resistive thermal devices (RTDs) located near a heat source. For example, in one configuration, chip 38 comprises two RTDs located on either side of a heat source. More than one heat source may be used. An RTD typically comprises an electrical conductor with a resistance to the flow of electricity through it, the material being selected such that the electrical resistance varies with temperature. Thus, the temperature of an RTD can be sensed, for example, by passing a fairly constant electrical current through the RTD and measuring the voltage across it. In an exemplary embodiment where two RTDs are located on either side of a heat source, for either flow direction through internal flow passage 41, one RTD is substantially upstream of the heat source, and the other RTD is substantially downstream of the heat source. Thus, as the fluid flows through internal flow passage 41, the fluid flowing past the downstream RTD has been heated by the heat source, while the fluid flowing past the upstream heat source has not. From the difference in temperature between the two RTDs, the flow rate through internal flow passage 41 may be determined.

FIG. 11 illustrates one exemplary embodiment of chip 38, a microbridge, which may be used to measure mass flow rate. In the embodiment shown, chip 38 is formed on silicon substrate 51, and comprises bridges 58 and 59, located in the flow of fluid 43. Bridge 58 contains RTD 54, while bridge 59 contains RTD 55. RTDs 54 and 55 may be thin film platinum put down as evaporated platinum film. Bridges 58 and 59 may be formed by depositing a layer of silicon nitride on silicon substrate 51, depositing the platinum film, and then etching the silicon nitride out from under the platinum film. In the exemplary embodiment shown in FIG. 11, heater 52 comprises two substantially equal parts, one on bridge 58, and one on bridge 59. A wheat stone bridge may be used, which may be set to 160 degrees Celsius. Because the components are generally small, the response time is generally short, for instance, about 1 msec. The exemplary embodiment of chip 38 may use 50 mW of electricity at 10 V DC (plus or minus 5%), and may output 0 to 60 mV. In one embodiment:

$$V_{out}=1+(0.0186)M-(5.1E-5)M^2+(8.4E-8)M^3-(7E-11)M^4+(2.3E-14)M^5$$

where M is mass flow rate in sccm. However, variations in supply voltage may result in a proportional variation in output.

Lead frame 33, as shown for example in FIG. 2, is a conductor, usually metal, and typically provides the electrical connections to chip 38. In other words, lead frame 33 is typically connected to, or in electrical communication with, the electronic sensor or chip 38. Lead frame 33 may be integrally molded within the body (e.g. within base 32). In other words, lead frame 33 may be placed within the mold when part of the body (e.g. base 32) is formed, so that the material (e.g. plastic) of the body surrounds part of lead frame 33. Lead frame 33 may be dual, in other words, have pins for connections on at least two approximately opposite sides (as shown). Alternatively, lead frame 33 may be single, meaning that is has pins on just one side (not shown). Lead frame 33 may be in-line, meaning that all pins on each side are substantially in one plane (as shown). On the other hand, the pins of lead frame 33 may be arranged differently, e.g. in a circle or in multiple planes. Accordingly, first exemplary embodiment 30 with lead frame 33 as shown on the figures with pins on two sides and the pins in substantially the same plane on each side herein embodies a dual in-line package.

To obtain a good seal between lead frame 33 and base 32 over a range of temperatures, which is desirable in many applications, the materials may be selected so that the coefficient of thermal expansion of lead frame 33 is below the coefficient of thermal expansion of the surrounding body (e.g. base 32). For instance, the coefficient of thermal expansion of lead frame 33 may be less than 10 parts per million per degree Celsius (PPM/°C.). As an example, lead frame 33 may be bronze or nickel-iron. Base 32 may be formed from a non-conducting material, for instance, plastic. Where a wide temperature range is desirable, base 32 may be a thermal plastic, i.e. one suitable for the temperature range desired. For example, embodiments of the present invention may have a storage temperature range of 20 to 60 degrees Celsius, and an ambient operating temperature range of 0 to 60 degrees Celsius at a maximum relative humidity of 95%. To obtain a good seal between base 32 and lead frame 33, base 32 may be made of a material with a coefficient of thermal expansion greater than 50 PPM/°C. For example, base 32 may be made of polyetherimide, polysulfone, or syndiotactic polystyrene. The material that base 32 is made of should generally be capable of maintaining a smooth finish to facilitate forming a good seal as will be discussed with reference to other figures below. The smooth surface finish also reduces the turbulence in the flow of the fluid during use. Flow tube 31, as shown in FIG. 3, may be formed from the same material as base 32, or from another material, preferably having similar characteristics.

As mentioned above, first exemplary embodiment 30 is made of two parts (flow tube 31 and base 32) that are configured to snap together. Various mechanisms can provide this snap feature, many of which are known in the art. The exemplary embodiment snap mechanism shown comprises snap connectors 36, and is shown best in FIGS. 2, 3, 7, and 8. In other words, in the exemplary embodiment shown, the two parts of the body (e.g. flow tube 31 and base 32) are preferably attachable to each other with snap connectors 36. As seen best in FIG. 3, snap connectors 36 may be constructed with loops 46. Loops 46 are preferably part of (e.g. integrally molded with in one continuous piece) one of the parts of the body, e.g. flow tube 31 as shown. As seen best in FIG. 2, in the embodiment depicted, loops 46 are configured to fit into holes 47 in base 32. As shown best in FIG. 8, when flow tube 31 is installed onto base 32, each loop 46 may go into a hole 47 and deform outward elastically over a projection 45, and snap back into place. Thus, typically attaching flow tube 31 to base 32 at the location of each snap connector 36. An interference fit may be provided, for instance, between projection 45 and loop 46 to prevent relative motion between flow tube 31 and base 32 when they are assembled. An interference fit at this location also helps to maintain a constant and precise distance between the top of chip 38 and flow tube 31, the benefit of which is described in more detail below.

As is illustrated in FIGS. 5 and 6, there is a joint 42 between flow tube 31 and base 32. In other words, flow tube 31 and base 32 are joined by joint 42. Since flow tube 31 and base 32 typically form the top and bottom of internal flow passage 41, joint 42 is preferably sealed to reduce, or ideally eliminate, leakage through joint 42. There are several ways to seal joint 42, one of which is illustrated in first exemplary embodiment 30, particularly in FIGS. 5, 6, 9, and 10. In first exemplary embodiment 30, joint 42 is sealed with a seal or gasket 39. Gasket 39 is preferably formed from a compressible material with a smooth surface such as rubber, or more commonly, synthetic rubber. In other words, gasket 39 is preferably an elastomer or an elastomeric seal. In such an embodiment, there is preferably an open space 49 (as shown in FIGS. 9 and 10) on at least one side of gasket 39 to allow for expansion of gasket 39. Gasket 39 may be a separate piece, or may be molded into base 32 or flow tube 31. Molding gasket 39 into base 32, as an example, has the advantages of preventing leakage of the fluid 43 between base 32 and gasket 39, and also reduces the number of parts, thus typically simplifying manufacturing. In this example where gasket 39 is molded into base 32, compressing gasket 39 against flow tube 31 typically results in a good seal between gasket 39 and flow tube 31 as well. Thus, gasket 39 seals joint 42. Other ways to obtain a good seal include using o-rings, heat staking, ultrasonic welding, and the use of glue or adhesives. Many such methods are well known in the art; and may eliminate the need for a snap feature (e.g. snap connectors 36) to connect flow tube 31 to base 32. Specifically, adhesives may be employed as dispensed liquids, b-stage preformes, or predispensed and b-staged on flow tube 31, on base 32, or on both.

The vertical distance from the top of the sensor chip 38 to the surface of the mating flow tube 31 may be controlled in order to obtain a consistent cross-sectional area and achieve improved accuracy and interchangeability between different units (e.g. exemplary embodiment 30). One method to control this distance is to have smooth horizontal mating surfaces on the molded parts (i.e. on flow tube 31 and base 32) at joint 42. In embodiments where a sealant or adhesive is used to attach the body parts, it is preferable to apply the adhesive to vertical surfaces rather than to the horizontal surface of joint 42. Use of a sealant or adhesive on the horizontal surfaces of joint 42 typically results in less consistent vertical dimensions. An expansion space, e.g. in the vertical direction, may help to prevent the sealant from affecting vertical tolerances. In first exemplary embodiment 30, a minimum amount of variation of vertical distance due to surface imperfections in mating surfaces is achieved by the interference snap fit used to assemble the body (flow tube 31 and base 32). In other embodiments, the same effect is achieved with controlled clamping forces during welding or adhesive bonding.

One feature or novelty of the present invention is that it may typically be fabricated in sizes smaller than the prior art. Specifically, prior art devices are typically no smaller than 1 ½ inches on each side, thus occupying a volume of at least 3.375 cubic inches. In contrast, embodiments of the present invention may have a body (e.g. flow tube 31 and base 32) with outside dimensions of width, depth, and height that are each less than 1.5 inches. The present invention may, as an example, have outside dimensions of width, depth, and height such that width X (multiplied by) depth X height is less than (<) 0.5 cubic inch. The present invention may even be, for example, as small as about 1 inch by ½ inch by ½ inch, thus occupying a volume of about 0.25 cubic inches. It may be even smaller. Thus, embodiments of the present invention may have a body (e.g. flow tube 31 and base 32) with a volume of less than 0.25 cubic inch.

Figure 12:
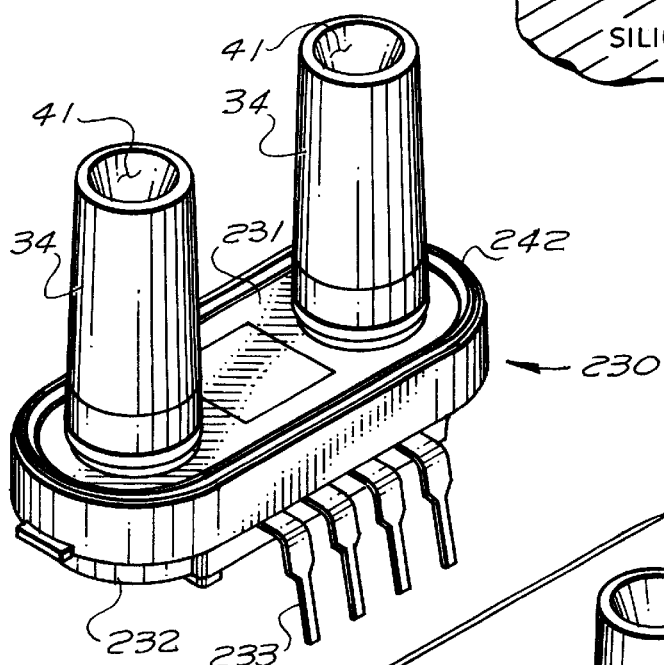
FIGS. 12–14 illustrate a second exemplary embodiment of the present invention and showing an exemplary embodiment of venturis in the port tubes, and specifically.
Figure 13:
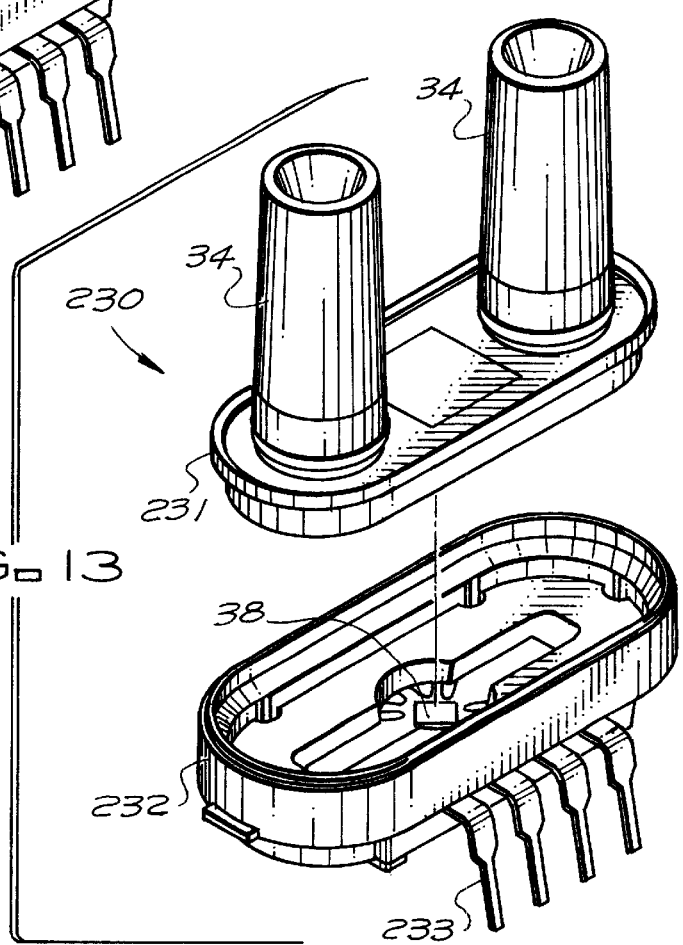
Figure 14:
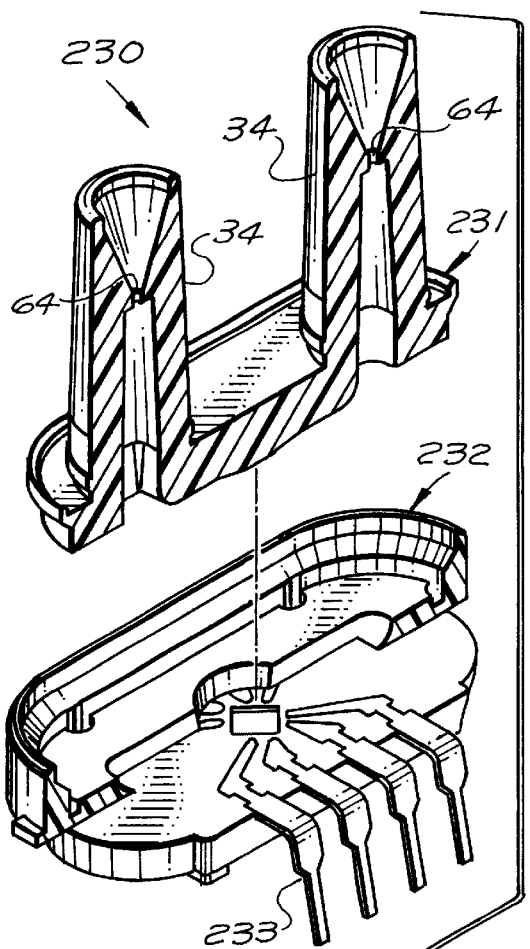

FIGS. 12–14 illustrate second exemplary embodiment 230. Second exemplary embodiment 230 is generally similar to first exemplary embodiment 30 except as shown or indicated herein, and typically has a chip 38, which may be as described above, located within an internal flow passage. Specifically, second exemplary 230 typically does not have snap connectors 36. Second exemplary embodiment 230 typically has a body comprised of two major parts, flow tube 231 and base 232, between which there is a joint 242. In other words, flow tube 231 and base 232 are joined by joint 242. Joint 242 may be secured or attached with a sealant or adhesive. Alternatively, or in addition, there may be an interference or snap fit between flow tube 231 and base 232. Joint 242 may include an elastomeric seal, which may be integral with either flow tube 231 or base 232.

Lead frame 233 is similar to lead frame 33 described above, except that the pins of lead frame 233 are bent downward as shown. Other pin angles could be used on either embodiment. FIG. 14 illustrates how lead frame 233 may be embedded or molded within base 232. Lead frame 233 typically comprises a plurality of pins or conductors, e.g. eight, as typically shown in the figures. As shown best in FIG. 14, each of the conductors in lead frame 233 typically terminate close to chip 38 so that chip 38 may readily be electrically connected to lead frame 233. Chip 38 is typically electrically connected to lead frame 233 in ways known in the art. Although generally electrically isolated (i.e. electrically insulated from each other) when manufacturing is complete, the plurality of conductors of lead frame 233 may be formed from one piece of plate or sheet metal prior to being molded into base 232. With such a manufacturing process, part of the sheet metal is trimmed off after base 232 is molded, leaving the electrically isolated conductors or pins. The pins of lead frame 233 are generally configured for electrical connection to external devices or connectors (e.g. female connectors) in ways known in the art.

An exemplary embodiment of port tubes 34 is illustrated, for example, in FIG. 14. Although illustrated in FIG. 14 in second exemplary embodiment 230, the exemplary embodiment of port tubes 34 shown in FIG. 14 may be used with first exemplary embodiment 30 described above, fourth exemplary embodiment 430 described below, or other embodiments, typically including many not shown. Port tubes 34 may be substantially straight, as shown, and the two port tubes 34 may be substantially parallel (i.e. have substantially parallel centerlines). This may result, as shown, in internal flow passage 41 being substantially U shaped. Port tubes 34 may be hollow and have a relatively thin wall. Such a configuration minimizes the pressure drop at the maximum flow rate, typically about 1 standard liter per minute (slpm). However, turbulence may be created, e.g. near chip 38, which may result in inaccuracies. Alternatively, port tubes 34 may contain features to restrict the flow and reduce turbulence. For instance, filters, orifice plates or venturis 64 (shown) may be provided inside port tubes 34. Venturis 64 offer the advantage over orifice plates (not shown) that they typically result in less turbulence at chip 38. Locating the features that restrict the flow (e.g. venturis 64) far away from chip 38, and maintaining a smooth surface finish within internal flow passage 41, also generally reduces the turbulence at chip 38. The venturis 64 may be integrally molded with port tubes 34 and flow tube 31. In addition to reducing turbulence, features to restrict the flow (e.g. venturis 64) typically create a controlled and specific pressure drop at a given flow rate. For instance, configurations of the present invention may typically pass about 0.2 slpm at 10 mbar or may have a pressure drop of about 872 Pa at a mass flow rate of about 200 sccm of air.

Figure 19:
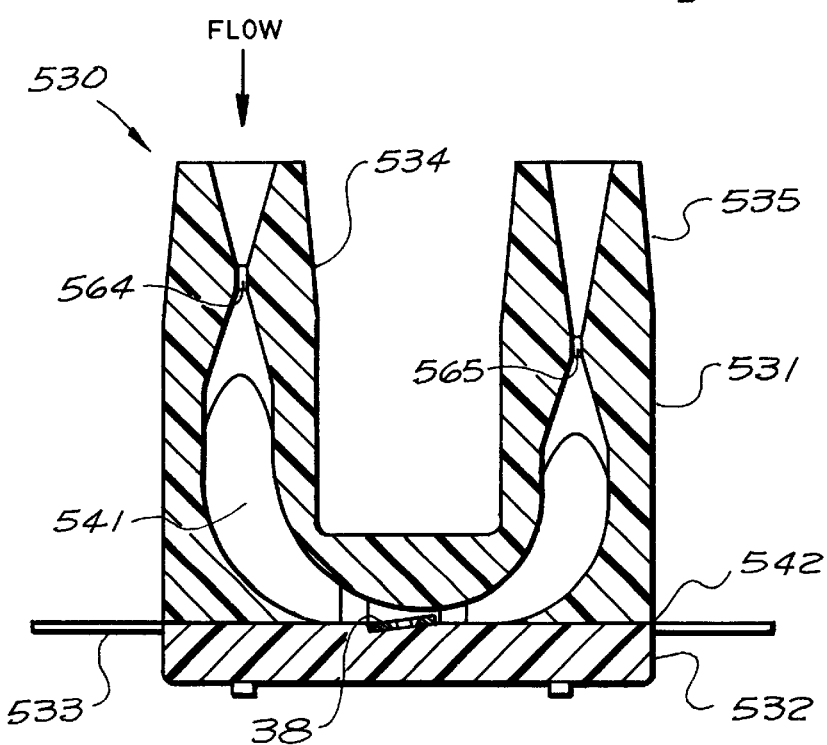
FIG. 19 illustrates through a cross-sectional side view a fifth exemplary embodiment of the present invention, and specifically illustrates an exemplary embodiment of an asymmetrical internal flow passage with dissimilar venturis in the port tubes at different distances from the chip, and the chip mounted at an angle relative to the flow passage.

The present invention may be configured to provide substantially equal performance for flow in either direction. In such an embodiment, flow tube 31, base 32, and chip 38 may be configured such that internal flow passage 41 has the same shape in either direction. In other words, in such an embodiment, internal flow passage 41 is symmetrical. In addition, chip 38 is typically parallel to the flow passage and the internal shapes or geometries of the two port tubes 34 are substantially identical. In this embodiment, if port tubes 34 contain venturis 64, then the two venturis 64 are typically substantially the same shape and substantially the same distance from chip 38. In other embodiments, the present invention may be designed to measure flow only in one direction, or to have a different output for flow in one direction, as compared with the other. See for example, FIG. 19, which is described in detail below. In such embodiments, the internal flow passage 41 may not be symmetrical. As an example, the port tubes 34 may not be the same. For instance venturis 64 may have different shapes or geometries, or may be different distances from chip 38. In other such non-symmetrical embodiments, only one port tube 34 may be provided. In addition, in non-symmetrical embodiments, in order to reduce turbulence or reduce the potential for contamination from dirt, chip 38 may be rotated out of the horizontal and into the flow, e.g. as shown in FIG. 19. In other words, chip 38 may be oriented an angle relative to the flow. This angle may be small, for instance, about 15 degrees from being parallel to the flow passage (e.g. internal flow passage 541 in FIG. 19).

Figure 15:
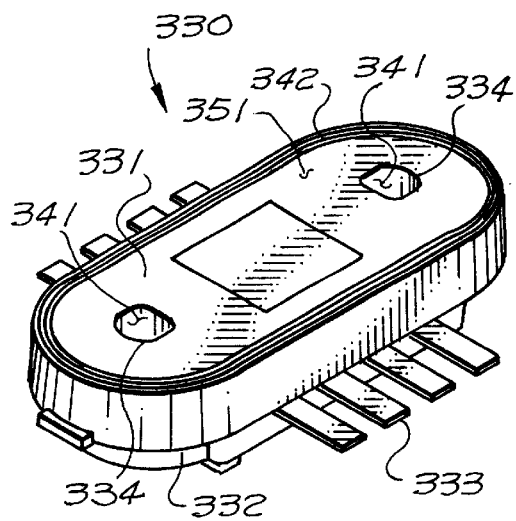
FIG. 15 illustrates a third exemplary embodiment of the present invention configured to mount on a manifold.

FIG. 15 illustrates third exemplary embodiment 330, which is configured for mounting on a manifold. Third exemplary embodiment 330 is generally similar to first exemplary embodiment 30 or to second exemplary embodiment 230, except that third exemplary embodiment 330 typically does not have port tubes 34. Third exemplary embodiment 330 typically has a body comprised of two main parts, flow tube 331 and base 332, which are typically joined by joint 342. Joint 342 may be similar to joints 42 or 242 described above. Joint 342 may include an elastomeric seal, which may be integral with either flow tube 331 or base 332. Third exemplary embodiment 330 typically has a transducer or chip (not shown), which may be as described above (e.g. chip 38), located within an internal flow passage 341. Although not shown in FIG. 15, flow tube 331 and base 332 may be joined with snap connectors 36, or other snap features as described above. Third exemplary embodiment 330 typically has ports 334 in face 351 of flow tube 331. A seal may be formed between the manifold and face 351, e.g. with gaskets, o-rings, sealant, or other means know in the art. FIG. 15 also illustrates an alternate shape for the pins of the lead frame, herein lead frame 333. Lead frames with pins the shape of lead frame 333 may be used on many of the embodiments of the present invention. Lead frame 333 may be similar to lead frames 33 or 233 described above except as to shape of the pins as shown.

Figure 16:
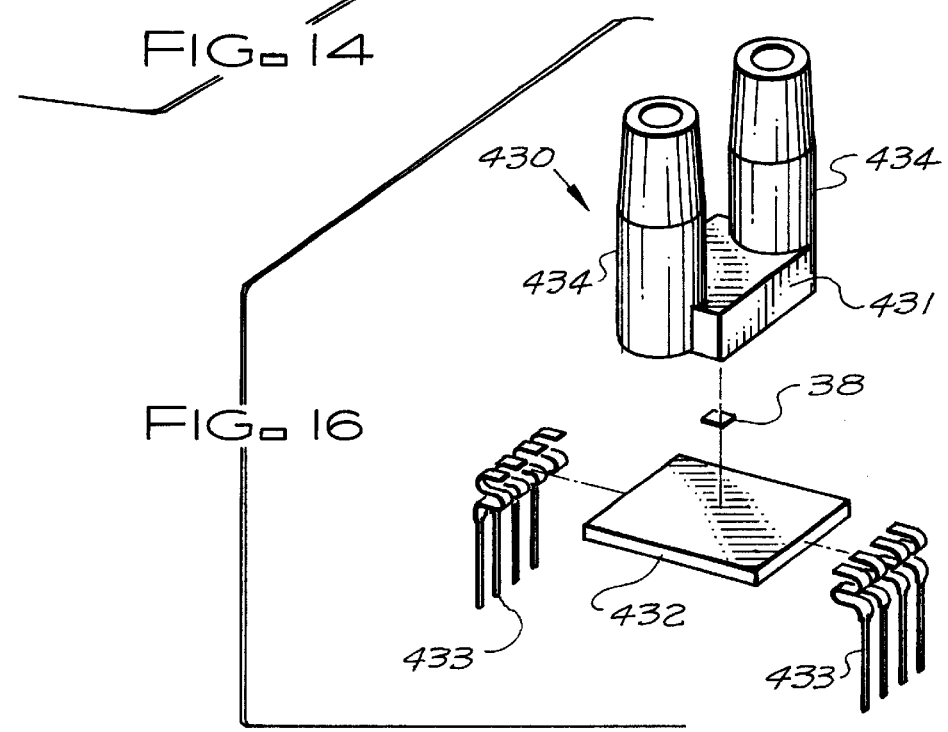
FIGS. 16–18 illustrate a fourth exemplary embodiment of the present invention and specifically.
Figure 17:
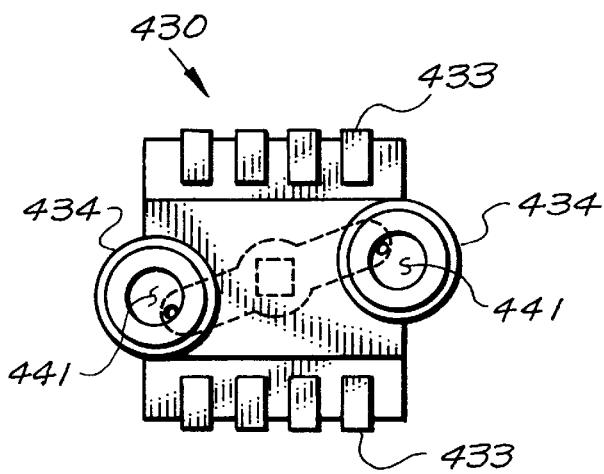
Figure 18:
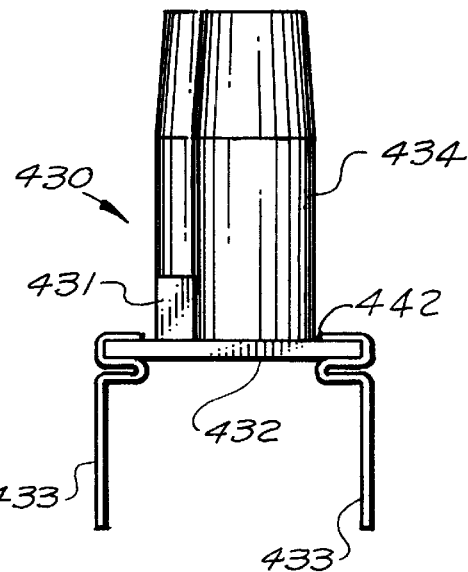

FIGS. 16 through 18 illustrate fourth exemplary embodiment 430. Fourth exemplary embodiment 430 is generally similar to the exemplary embodiments described above except as noted herein or shown in the figures. Fourth exemplary embodiment 430 typically has a body comprising two parts, flow tube 431 and base 432, which are typically joined with joint 432. Flow tube 431 and base 432 may be joined or attached, e.g. with an adhesive, to form internal flow passage 441, typically in a manner that forms a seal between flow tube 431 and base 432. Joint 442 may include an elastomeric seal, which may be integral with either flow tube 431 or base 432, or joint 442 may include a sealant, which may also serve as an adhesive. Flow tube 431 may have port tubes 434 as shown, generally similar to the port tubes 34 of first exemplary embodiment 30 and second exemplary embodiment 230 described above, or flow tube 431 may be configured for manifold mounting (not shown) similar to third exemplary embodiment 330 described above. On the other hand, port tubes 434 may be asymmetrical similar to port tubes 534 and 535 described below with reference to FIG. 19. In exemplary embodiment 430 shown, chip 38 and lead frame 433 are attached to base 432. Lead frame 433 is typically in electrical communication with chip 38, usually via conductors within base 432. For example, base 432 may be a thick film network. Chip 38 may be as described above for other embodiments, and is generally located within internal flow passage 441.

FIG. 19 illustrates a fifth exemplary embodiment 530. Fifth exemplary embodiment 530 is generally similar to the exemplary embodiments described above except as noted herein. Fifth exemplary embodiment 530 typically has a body comprising two parts, flow tube 531 and base 532, which may be joined with joint 542 (e.g. in one of the ways described above) to form internal flow passage 541. Joint 542 may include an elastomeric seal or gasket, which may be integral with either flow tube 531 or base 532. Flow tube 531 may have port tubes 534 and 535 as shown, except as shown and noted generally similar to the port tubes 34 of first exemplary embodiment 30 and second exemplary embodiment 230 described above. Port tubes 534 and 535 may have devices to restrict the flow, e.g. venturis 564 and 565 as shown. In fifth exemplary embodiment 530, lead frame 533 is shown molded into base 532 at the ends or shorter sides rather than at the longer sides. Such a configuration could be used with many of the embodiments of the present invention, including those described above. In addition, in exemplary embodiment 530, lead frame 533 could be similar to the lead frames described above with reference to other exemplary embodiments. Fifth exemplary embodiment 530 is asymmetrical, and consequently, typically provides different output for flows in the two different directions. Specifically venturis 564 and 565 may be different shapes or may be a different distance from chip 38, both such conditions being shown. In addition, chip 38 may be mounted at an angle with respect to the flow as shown, and as described above. Chip 38 may be as described above for other embodiments, and is typically located within internal flow passage 541. Fifth exemplary embodiment 530 may be suitable for use with flow only in one direction, e.g. in the direction indicated.

In the foregoing specification, the invention has been described with reference to specific exemplary embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. In addition, benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for sensing the motion of a fluid, the system comprising:

a body made of a thermal plastic, said body having an internal flow passage;

said body forming at least two elongated port tubes, said port tubes being in fluid communication with said flow passage;

said body having outside dimensions of width, depth, and height that are each less than 1.5 inches; and said body comprising a first part and a second part, said first part and said second part being joined by a joint;

said joint attaching by at least one selected from the group consisting of: snap together, adhesive, heat staking, ultrasonic welding, and combinations thereof;

an electronic sensor located within said flow passage;

said sensor comprising an RTD and at least one heat source; and a metal lead frame, said lead frame being in electrical communication with said sensor;

said lead frame being molded within said body; and wherein said metal lead frame comprises a metal having a lower coefficient of thermal expansion than said plastic of said body;

the fluid being a gas; and the motion being flow rate.

2. The system according to claim 1, wherein said metal has a coefficient of thermal expansion that is less than about 10 parts per million per degree Celsius, wherein said plastic has a coefficient of thermal expansion that is greater than about 50 parts per million per degree Celsius, wherein said sensor comprises two RTDs located on either side of the at least one heat source, wherein said port tubes each comprises a venturi, and wherein the flow rate is mass flow rate.

3. The system according to claim 1, wherein said internal flow passage and said sensor are substantially symmetrical such that said system is configured to measure the flow rate of the fluid substantially equally in either flow direction, wherein said system is configured for mounting selected from the group consisting of surface mounting and through-hole mounting, and wherein the gas is air.

4. The system according to claim 1, wherein said lead frame has pins on substantially opposite sides of said body, wherein said body has a first side, wherein said lead frame has a first set of pins projecting from said first side, wherein said first set of pins all are in substantially the same plane, wherein said body has a second side, wherein said lead frame has a second set of pins projecting from said second side, and wherein said second set of pins all are in substantially the same plane.

5. The system according to claim 1, wherein said body has a volume of less than about 0.25 cubic inch.

6. A system for sensing the pressure or flow rate of a fluid, the system comprising:

a body having an internal flow passage, said body comprising a first part and a second part;

said first part and said second part being joined by a joint;

said first part being attachable to said second part with snap connectors;

one of said first and second parts comprising a port tube;

said port tube being substantially straight;

said port tube comprising a restriction;

said joint comprising an elastomeric seal;

said elastomeric seal being integral with said first part;

a transducer located within said flow passage; and a metal lead frame, said lead frame being in electrical communication with said transducer;

said metal lead frame being comprised of a metal having a lower coefficient of thermal expansion than said body; and said lead frame being integrally molded with said body.

7. The system according to claim 6, wherein said port tube comprises a first port tube, wherein said metal lead frame forms a dual in-line package with respect to said body, wherein said body has outside dimensions of width, depth, and height that are each less than 1.5 inches, and wherein said one of said first and second parts further comprises a second port tube, and wherein said first and second port tubes are substantially parallel.

8. A system for measuring the flow rate of a gas, the system comprising:

a body having a body internal flow passage;

said body comprising a first part and a second part;

said first part and said second part being joined by a joint;

said first part and said second part being configured to snap together;

said body having outside dimensions of width, depth, and height such that width multiplied by depth multiplied by height is less than 0.5 cubic inches; and a sensor located within said flow passage;

said sensor comprising two RTDs located on either side of at least one heat source.

9. The system according to claim 8, wherein said body has first and second ports with corresponding first and second port internal flow passages, wherein said body internal flow passage and said first and second port internal flow passages form a continuous U-shaped flow path, and wherein said flow path and said sensor are substantially symmetrical such that said system is configured to measure the flow rate of the gas substantially equally in either flow direction.

10. The system according to claim 8, wherein said body consists substantially of thermal plastic, wherein said body comprises two elongated port tubes, and wherein said port tubes each comprises a venturi.

* * * * *